(12) United States Patent
Vijayakumari Rajendran Nair et al.

(10) Patent No.: US 9,996,422 B2
(45) Date of Patent: *Jun. 12, 2018

(54) METHODS AND SYSTEMS FOR A COPY-OFFLOAD OPERATION

(71) Applicant: NETAPP, INC., Sunnyvale, CA (US)

(72) Inventors: Saji Kumar Vijayakumari Rajendran Nair, Cupertino, CA (US); John Meneghini, Billerica, MA (US); Arun Kumar Rajendran, Bangalore (IN); Frederick Knight, Apex, NC (US)

(73) Assignee: NETAPP, INC., Sunnyvale, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/369,328

(22) Filed: Dec. 5, 2016

(65) Prior Publication Data
US 2017/0235639 A1 Aug. 17, 2017

Related U.S. Application Data

(63) Continuation of application No. 14/305,910, filed on Jun. 16, 2014, now Pat. No. 9,514,210.

(51) Int. Cl.
*G06F 17/30* (2006.01)
*G06F 11/14* (2006.01)

(52) U.S. Cl.
CPC .... *G06F 11/1446* (2013.01); *G06F 17/30117* (2013.01); *G06F 17/30171* (2013.01); *G06F 17/30581* (2013.01); *G06F 2201/825* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 8,832,024 | B2 * | 9/2014 | Knight | G06F 3/0608 707/610 |
| 9,071,585 | B2 * | 6/2015 | Green | H04L 67/1095 |
| 9,092,149 | B2 * | 7/2015 | Green | G06F 3/062 |
| 9,262,491 | B2 * | 2/2016 | Nambiar | G06F 17/30557 |
| 2007/0050429 | A1 * | 3/2007 | Goldring | G06F 17/30551 |
| 2012/0079583 | A1 * | 3/2012 | Christiansen | G06F 3/061 726/9 |

* cited by examiner

*Primary Examiner* — Anh Tai Tran
(74) *Attorney, Agent, or Firm* — Klein, O'Neill & Singh, LLP

(57) ABSTRACT

Methods and systems for a copy-offload operation are provided. A soft range lock is placed for a data container for generating a token for a copy-offload operation for copying the data container from a source location to a destination location, where presence of the soft range lock indicates that content of the data container has not changed during the copy-offload operation. A token for the copy-offload operation represents the content of data container and includes information regarding the soft range lock. The token with the soft range lock information is provided to the client that requests the copy-offload operation. If the soft range lock exists, then the data container is copied without using a point in time copy of the data container.

22 Claims, 9 Drawing Sheets

METHODS AND SYSTEMS FOR A COPY-OFFLOAD OPERATION

Cross-reference to Related Application:

This patent application claims priority of and is a continuation of U.S. patent application Ser. No. 14/305,910 filed on Jun. 16, 2014, and now U.S. Pat. No. 9,514,210, the disclosure of which is incorporated herein by reference in its entirety.

TECHNICAL FIELD

The present disclosure relates to storage systems and more particularly, to performing copy-offload operations.

BACKGROUND

Various forms of storage systems are used today. These forms include direct attached storage (DAS), network attached storage (NAS) systems, storage area networks (SANs), and others. Storage systems are commonly used for a variety of purposes, such as providing multiple users with access to shared data, backing up data and others.

A storage system typically includes at least a computing system (may also be referred to as a "server" or "storage server"), which is a processing system configured to store and retrieve data on behalf of one or more client computing systems ("clients"). The storage system may be presented to a client system for storing information.

Traditionally, when a client system intends to copy data from a source storage location to a destination storage location, the storage system retrieves the data, provides the data to the client system, the client system saves the data at a memory location and then data is transferred to the destination storage location. The source and the destination storage locations may be within a same storage device.

The traditional client centric copy approach described above has shortcomings because it consumes processing resources as well as network bandwidth. To alleviate the shortcomings of the traditional approach, a "copy-offload" process is now used to copy information directly between the source and destination locations without having to send the actual information to the client.

The following process steps are typically used to copy a source data container from a source location to a destination location, using a copy-offload operation: (a) The source data container is first opened at a first server. (b) A token that represents information of the source data container is generated and provided to the client. (c) The client then sends a copy-offload write request and provides the token. (d) A destination data container is opened and then using the token, the destination is instructed to copy the data from the source location.

One conventional method for performing a copy-offload operation takes a point in time copy (or snapshot) of the data container during token creation. The point in time copy is a part of an intermediate staging file called the "pit file". The pit file represents data that won't change as long as the token is valid. Creating the token by taking the snapshot is undesirable since it uses processing time and may limit a size of the token. Continuous efforts are being made to efficiently perform copy-offload operations, preferably without taking a point in time copy of the data container that is being copied.

SUMMARY

In one aspect, a machine implemented method is provided. The method includes placing a soft range lock for a data container for generating a token for a copy-offload operation for copying the data container from a source location to a destination location, where presence of the soft range lock indicates that content of the data container has not changed during the copy-offload operation. A token for the copy-offload operation represents the content of data container and includes information regarding the soft range lock. The method further includes providing the token with the soft range lock information to the client that requests the copy-offload operation; determining if the soft range lock exists before copying the data container to the destination location indicating that the data container content has not changed; and copying the data container to the destination location without using a point in time copy of the data container.

In another aspect, a non-transitory, machine readable storage medium having stored thereon instructions for performing a method, comprising machine executable code are provided. The machine executable code when executed by at least one machine, causes the machine to: place a soft range lock for a data container for generating a token for a copy-offload operation for copying the data container from a source location to a destination location, where presence of the soft range lock indicates that content of the data container has not changed during the copy-offload operation. A token for the copy-offload operation represents the content of data container and includes information regarding the soft range lock.

The machine executable code when executed, further causes the machine to: provide the token with the soft range lock information to the client that requests the copy-offload operation; determine if the soft range lock exists before copying the data container to the destination location indicating that the data container content has not changed; and copy the data container to the destination location without using a point in time copy of the data container.

In yet another aspect, a system with a memory having machine readable medium comprising machine executable code having stored thereon instructions; and a processor module coupled to the memory are provided. The processor module is configured to execute the machine executable code to place a soft range lock for a data container for generating a token for a copy-offload operation for copying the data container from a source location to a destination location, where presence of the soft range lock indicates that content of the data container has not changed during the copy-offload operation. A token for the copy-offload operation represents the content of data container and includes information regarding the soft range lock.

The processor module is further configured to execute the machine executable code to provide the token with the soft range lock information to the client that requests the copy-offload operation; determine if the soft range lock exists before copying the data container to the destination location indicating that the data container content has not changed; and copy the data container to the destination location without using a point in time copy of the data container.

This brief summary has been provided so that the nature of this disclosure may be understood quickly. A more complete understanding of the disclosure can be obtained by reference to the following detailed description of the various aspects thereof in connection with the attached drawings

BRIEF DESCRIPTION OF THE DRAWINGS

The various features of the present disclosure will now be described with reference to the drawings of the various aspects of the present disclosure. In the drawings, the same components may have the same reference numerals. The illustrated aspects are intended to illustrate, but not to limit the present disclosure. The drawings include the following Figures.

DETAILED DESCRIPTION

As a preliminary note, as used in this disclosure, the terms "component" "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computing device. By way of illustration, both an application running on a server and the server can be a component. One or more components may reside within a process and/or thread of execution and a component may be localized on one computer and/or distributed between two or more computers. Also, these components can execute from various non-transitory, computer readable media having various data structures stored thereon.

The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, non-transitory storage media or any other storage device type, in accordance with the claimed subject matter.

Methods and systems for a copy-offload operation are provided. The method includes placing a soft range lock for a data container for generating a token for a copy-offload operation for copying the data container from a source location to a destination location. The existence of the soft range lock indicates that content of the data container has not changed during the copy-offload operation. A token for the copy-offload operation represents the content of data container and includes information regarding the soft range lock.

The method further includes providing the token with the soft range lock information to the client that requests the copy-offload operation; and copying the data container if the soft range lock is in place.

Figure 1:
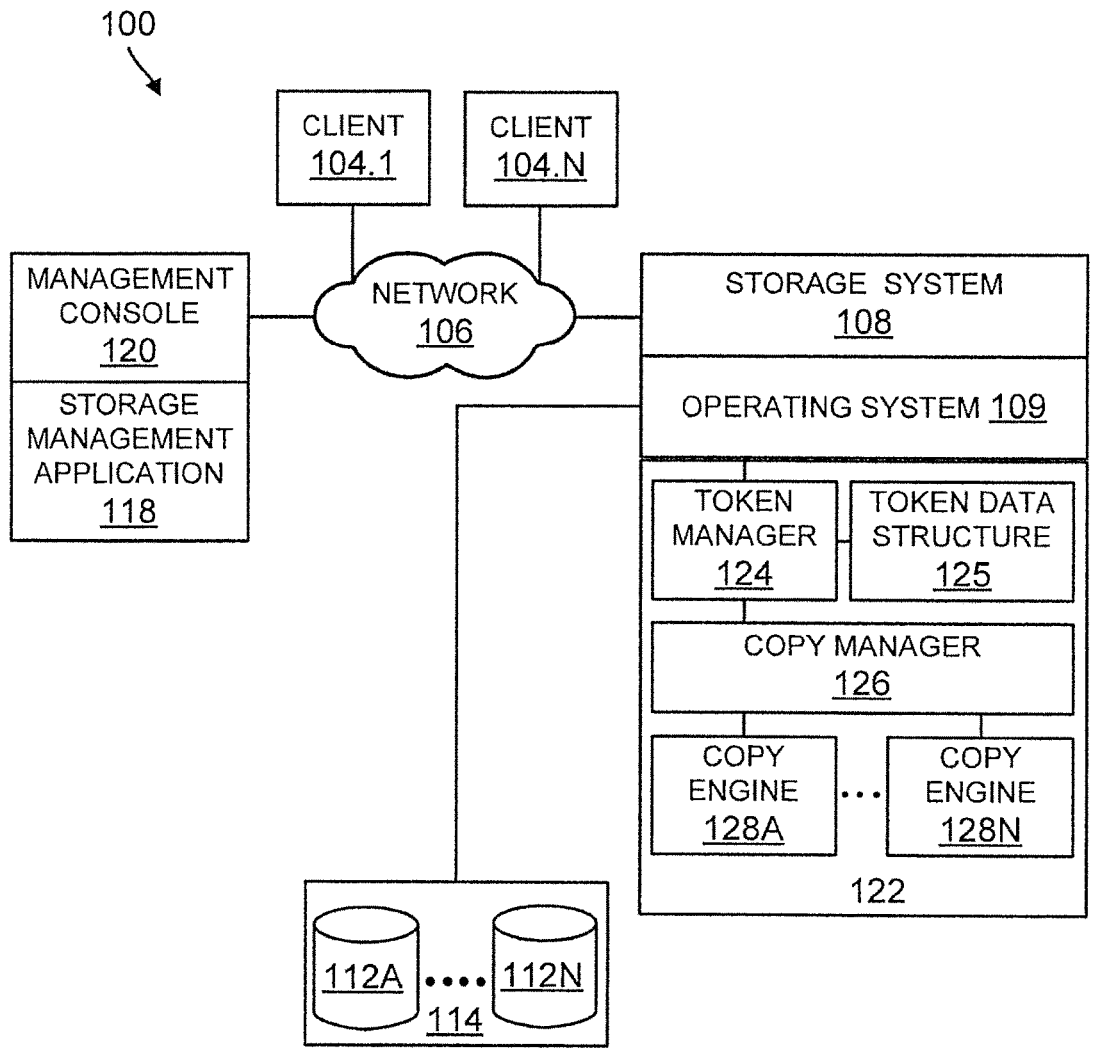
FIG. 1 shows an example of a non-cluster based storage environment, used according to one aspect of the present disclosure.

Non-Clustered Storage Environment 100: FIG. 1 depicts an illustrative aspect of a non-clustered storage environment 100, including a plurality of client computing systems/devices 104.1-104.N (may also be referred to as client 104 or clients 104), one or more storage system 108, a management console 120 and at least one interconnect system (or network) 106 communicably connecting client systems (or computing devices) 104.1-104.N, and a management console 120.

The storage system 108 may include or interface with a storage subsystem 114 having multiple mass storage devices 112A-112N (may also be referred to as storage device or storage devices 112). The mass storage devices 112 may be, for example, conventional magnetic disks, optical disks such as CD-ROM or DVD based storage, magneto-optical (MO) storage, or any other type of non-volatile storage devices suitable for storing structured or unstructured data.

The storage system 108 executes a storage operating system 109 for managing storage space within storage subsystem 114 and presenting storage space to clients 104. As an example, storage operating system 109 maybe the DATA ONTAP® storage operating system, available from NetApp®, Inc., that implements a Write Anywhere File Layout (WAFL®) storage system, or any other suitable storage operating system (without derogation of any trademark rights).

In one aspect, storage system 108 also includes a copy system 122 that interfaces with or includes a token manager 124, a copy manager 126 and copy engines 128A-128N for executing copy-offload operations. A copy-offload request may be received from one or more of clients 104 to copy certain data containers from a source location to a destination location. In response to the client request, the token manager 124 generates a token, which is a representation of the data that is being copied at any given time. The token manager 124 uses a token data structure 125 (also referred to as data structure 125) to track the tokens that are generated by the token manager 124.

The copy manager 126 interfaces between the token manager 124 and the storage operating system 109. The copy engines 128 are used for performing the actual copy operations. Details regarding copy-offload operations are provided below.

Storage operating system 109 and applications running on the client systems 104.1-104.N communicate according to well-known protocols, such as the NFS protocol or the CIFS protocol, to make data stored at storage device 112 appear to users and/or application programs as though the data were stored locally at the client systems 104.1-104.N. CIFS means the Common Internet File System Protocol, an access protocol that client systems use to request file access services from storage systems over a network. NFS means a Network File System, a protocol that allows a user to access storage over a network.

Storage operating system 109 can present or export data stored at storage devices 112 as a volume (may also be referred to as a storage volume), or one or more qtree sub-volume units, to each of the client systems 104.1-104.N. In one aspect, a volume is a logical data set which is an abstraction of physical storage, combining one or more physical mass storage devices or parts thereof into a single logical storage object. From the perspective of a client system 104, each volume can appear to be a single storage drive. However, each volume can represent the storage space in one storage device, an aggregate of some or all of the storage space in multiple storage devices, a RAID group, or any other suitable set of storage space. Each volume may be configured to store data containers, for example, data files, scripts, word processing documents, executable programs, structured and unstructured data and the like. Specifically, each volume can include a number of individually addressable files.

The storage operating system 109 may implement a high-level module, such as a file system, to logically organize the information stored at storage devices 112 as a hierarchical structure of directories, files, blocks, structured and un-structured data (may be referred to as data containers). For example, each "on-disk" data container may be implemented as set of data structures, i.e., blocks, configured to store information, such as the actual data for storage volumes. These data blocks are organized within a logical volume block number (vbn) space that is maintained by the file system. The file system organizes the storage data blocks within the vbn space as a "logical volume"; each logical volume may be, although is not necessarily, associated with its own file system.

In a typical mode of operation, one of the client systems 104.1-104.N transmits one or more I/O (input/output) commands, such as an NFS or CIFS request, over network 106 to the storage system 108 to read or write information. The storage system 108 issues one or more I/O commands to storage device 112 to read or write the data on behalf of the client system. The storage system 108 also issues an NFS or CIFS response containing the requested data over network 106 to the client system.

The management console 120 may be, for example, a conventional PC, workstation, or the like. The storage management application 118 can be a software application, typically used by a storage network administrator to manage a pool of storage devices and other modules of system 100. The management application 118 may be used to configure the use of soft range locks for generating tokens for copy-offload operations, as described below in detail.

Communication between the storage management application 118 and storage system 108 may be accomplished using any of the various conventional communication protocols and/or application programming interfaces (APIs), the details of which are not germane to the technique being introduced here. This communication may be enabled by network 106 or via a direct link (not shown) between the management console 120 and one or more of the storage systems.

Figure 2A:
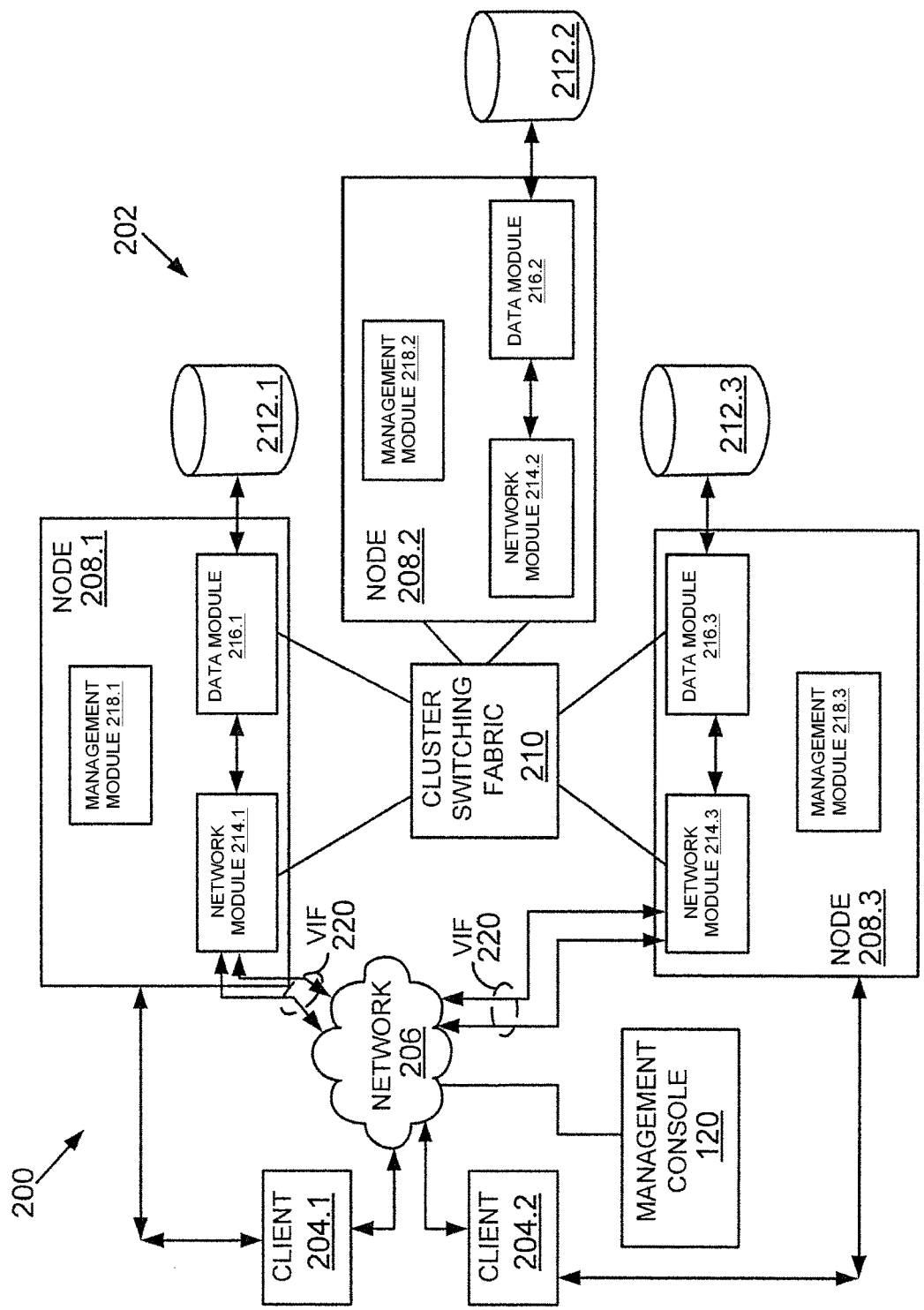
FIG. 2A shows a block diagram of a cluster based storage system, used according to one aspect of the present disclosure.

Clustered Storage Environment 200: The adaptive aspects described herein can be implemented in a cluster based system that has a distributed architecture, unlike the monolithic architecture of the non-clustered environment. FIG. 2A depicts an illustrative aspect of a clustered storage environment 200 including a plurality of client systems 204.1-204.2 (similar to clients 104.1-104.N), a clustered storage system 202 and at least one computer network 206 communicably connecting the client systems 204.1-204.2 and the clustered storage system 202. The clustered storage system 202 includes a plurality of nodes 208.1-208.3, a cluster switching fabric 210, and a plurality of mass storage devices 212.1-212.3.

Each of the plurality of nodes 208.1-208.3 may be configured to operate as a source storage system or a destination storage system. Each node may include an Network module, a Disk module, and an Management module, each of which can be implemented as a separate processor executable or machine implemented module. Specifically, node 208.1 includes an Network module 214.1, a Disk module 216.1, and an Management module 218.1, node 208.2 includes an Network module 214.2, a Disk module 216.2, and an Management module 218.2, and node 208.3 includes an Network module 214.3, a Disk module 216.3, and an Management module 218.3.

The Network modules 214.1-214.3 include functionality that enables the respective nodes 208.1-208.3 to connect to one or more of the client systems 204.1-204.2 over the computer network 206, while the Disk modules 216.1-216.3 connect to one or more of the storage devices 212.1-212.3.

The Management modules 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective Network modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2 depicts only the VIFs 220 at the interfaces to the Network modules 214.1, 214.3 for clarity of illustration.

The clustered storage system 202 can be organized into any suitable number of "vservers", in which each virtual storage system represents a single storage system namespace with separate network access. Each vserver has a user domain and a security domain that are separate from the user and security domains of other virtual storage systems. Client systems can access storage space via a VServer from any node of the clustered system 202.

Each of the nodes 208.1-208.3 may be defined as a computer adapted to provide application services to one or more of the client systems 204.1-204.2. The nodes 208.1-208.3 are interconnected by the switching fabric 210, which, for example, may be embodied as a Gigabit Ethernet switch or any other interconnect type.

Although FIG. 2A depicts three Network modules 214.1-214.3, the Disk modules 216.1-216.3, and the Management modules 218.1-218.3, any other suitable number of Network modules, Disk modules, and Management modules may be provided. There may also be different numbers of Network modules, Disk modules, and/or Management modules within the clustered storage system 202. For example, in alternative aspects, the clustered storage system 202 may include a plurality of Network modules and a plurality of Disk modules interconnected in a configuration that does not reflect a one-to-one correspondence between the Network modules and D-modules.

The client systems 204.1-204.2 of FIG. 2A may be implemented as general-purpose computers configured to interact with the respective nodes 208.1-208.3 in accordance with a client/server model of information delivery. In the presently disclosed aspect, the interaction between the client systems 204.1-204.2 and the nodes 208.1-208.3 enable the provision of network data storage services. Specifically, each client system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The client systems 204.1-204.2 may issue packets according to file-based access protocols, such as the NFS or CIFS protocol, when accessing information in the form of files and directories.

Figure 2B:
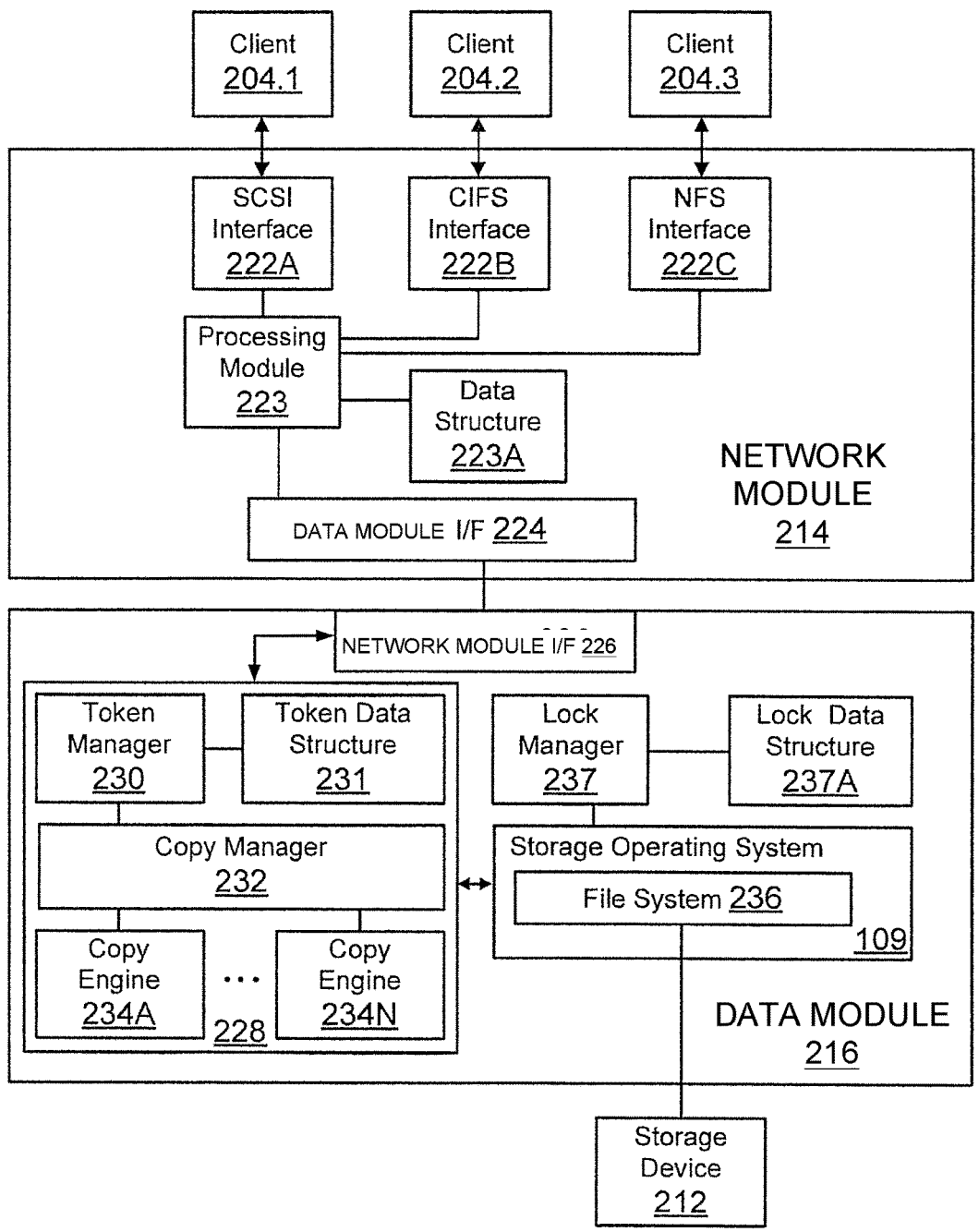
FIG. 2B shows an example of implementing a copy-offload system, according to one aspect of the present disclosure.

FIG. 2B shows a block diagram of implementing a copy-offload system 228 in a clustered environment, according to one aspect. Copy-offload system 228 is similar to the copy-offload system 122 described above with respect to FIG. 1.

As shown in FIG. 2B, Network module 214 includes different interface types to receive client requests that comply with different protocols. For example, Network module 214 includes a SCSI interface 222A to receive SCSI requests from a client 204.1; a CIFS interface 222B for receiving CIFS requests from a client 204.2 and a NFS interface 222C to receive requests from client 204.3. Network module 214 includes a processing module 223 that maintains a data structure 223A for processing copy-offload requests, as described below in detail. Network module 214 further includes a Disk module interface 224 for communicating with Disk module 216.

Disk module 216 includes an Network module interface 226 for sending and receiving information to and from Network module 214. Disk module 216 also executes a file system 236 that is a part of the storage operating system 109. The file system 236 interfaces with storage device 212 for reading and writing data.

Disk module 214 executes one or more components of the copy-offload system 228. The copy-offload system 228 interfaces with the file system 236, as described below in detail. The copy-offload system includes a token manager 230 (similar to 124) that maintains a token data structure 231 (also referred to as data structure 231), a copy manager 232 (similar to 126) and copy engines 234A-234N (similar to 128A-128N). It is noteworthy that data structure 231 may be a part of token manager 230 and is shown as a separate block for clarity in FIG. 2B. The various functions executed by the copy-offload system 228 are described below.

In one aspect, the storage operating system 109 maintains a plurality of lock types in responding to client requests for reading a data container, writing a data container or modifying a data container. The following provides a brief description of different lock types that may be used for managing access to data containers.

A "Shared Lock" is typically granted to a client application by storage operating system 109. The shared lock in the CIFS context represents an "open-mode", which defines the nature of access for an entity that opened the lock and what other applications/entities are allowed to do. For example, when the shared lock is opened for read and write for a data container and shared for just read, then the entity that opened the lock can read and write, while other entities are only permitted to read the data container.

"Byte range lock" is a lock type that limits access to a portion of a data container defined by a "byte range". A client may request to open a data container and request a lock for the byte range of the file.

"Soft range lock" is a lock type that is similar to the byte range lock but is "soft" in nature. This means if there is any conflict to the lock, the lock is invalidated. For example, assume that a soft range lock is granted for "read" access to an application. Subsequently, if an operation conflicts with the read access, for example, a write operation or a delete operation, then the soft range lock for the read access is invalidated.

To manage the various locks, the storage operating system 109 interfaces with or includes a lock manager 237 that maintains one or more lock data structures 237A (also referred to as data structure 237A). It is noteworthy that lock data structure 237A may be a part of lock manager 237 and is shown as a separate block for clarity in FIG. 2B. Data structure 237A identifies the data containers against which locks may have been granted and the identity of the entity to whom the lock is granted. The lock data structure 237A also stores lock attributes indicating the lock type.

The use of the copy-offload system 228 for performing a copy-offload operation is discussed below with respect to the process flows of FIGS. 2C-2F.

Figure 2C:
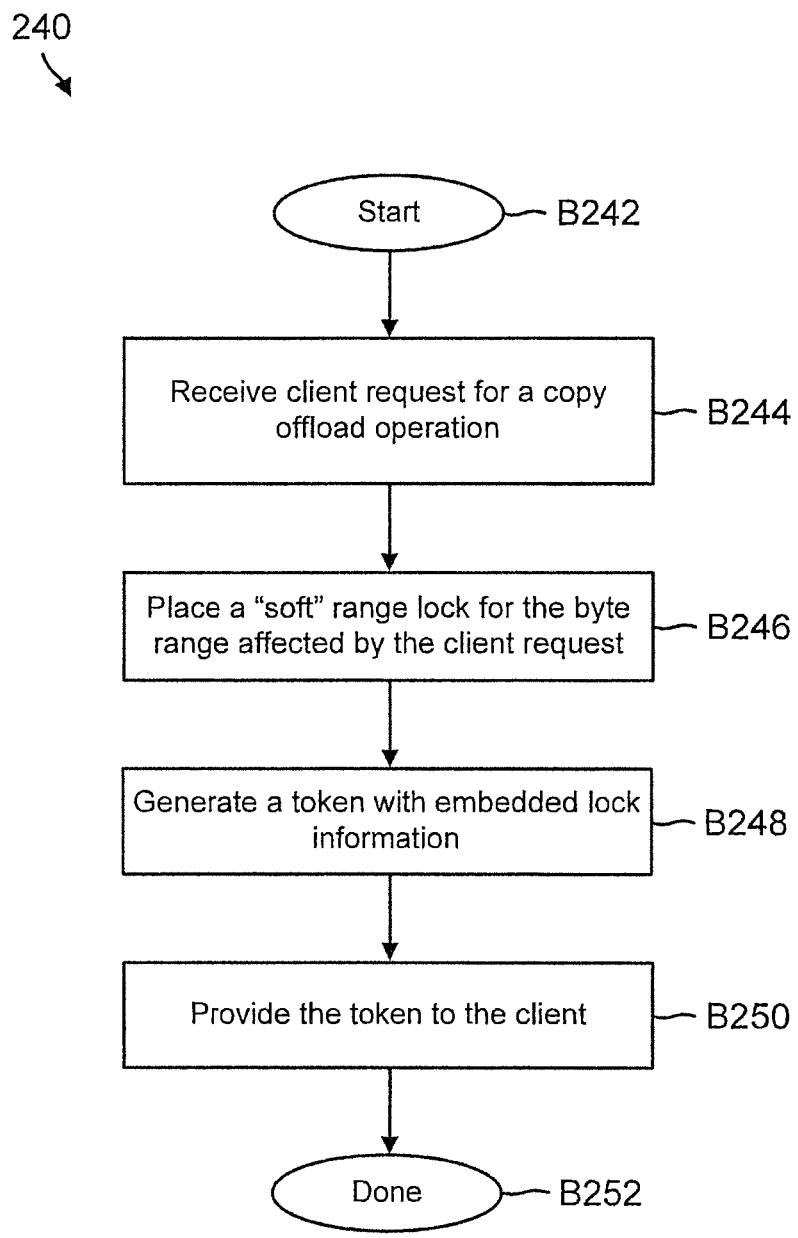
FIGS. 2C-2F show various process flow diagrams according to the various aspects of the present disclosure.

Process Flow: FIG. 2C shows a process 240 for creating a token for a copy-offload operation, according to one aspect. The copy-offload operation involves an offload read and an offload write request. The copy-offload operation is used to copy a data container stored at a source location to a destination location. The source and destination location may be at the same node or a different node.

The process begins in block B242, when client 204.1 (FIG. 2B) and the Network module 214/Disk module 216 are operational and initialized.

In block B244, the client request for a copy-offload operation is received by Network module 214. Initially, the request is for an offload read operation. The request is forwarded to the token manager 230. The token manager 230 requests the lock manager 237 to place a soft range lock on the byte range occupied by the data container. The lock manager 237 checks the lock data structure 237A to ensure that there will be no conflict with any existing lock that may already be in place. If there is no conflict, then the soft range lock is placed on the byte range of the data container. The lock is identified by a lock identifier and the token manager 230 is identified as the lock owner. The lock information is provided to the token manager 230.

In block B248, a token is generated by the token manager B248. The token may include a plurality of fields, for example: (a) Type: This field specifies the token type. (b) Length: This field indicates the length of the token. (c) Vendor Id: This field identifies, a vendor, for example, NetApp that provides the underlying storage. (d) Version: This field indicates the version of the token. (e) Protocol: This field includes the protocol that is used to create the token, for example, SMB (Server Message Block) protocol. (f) File Handle: This provides a volume identifier of the source data container. (g) Key: This field is a unique identifier for the token. (h) Cluster Identifier: This field identifies the cluster that created the token. This identifier can be used to determine if the copy-offload operation is within the same cluster or across another cluster. (i) Source Disk module identifier: This field identifies the source Disk module. (j) Destination Disk module identifier: This field identifies the destination Disk module identifier. (k) vServer Identifier: This field identifies the Vserver that created the token. (l) Lock information: This field identifies the soft range lock and the lock owner. It is noteworthy that the lock information may be a part of the token data structure 231 and may not be a part of the token. In another example, the lock information may be a part of both the token and the token data structure 231.

In block B250, the token is provided to the Network module 214 as part of an offload read operation. The Network module 214 provides the token to the client 204. Thereafter, the process ends in block B252.

Figure 2D:
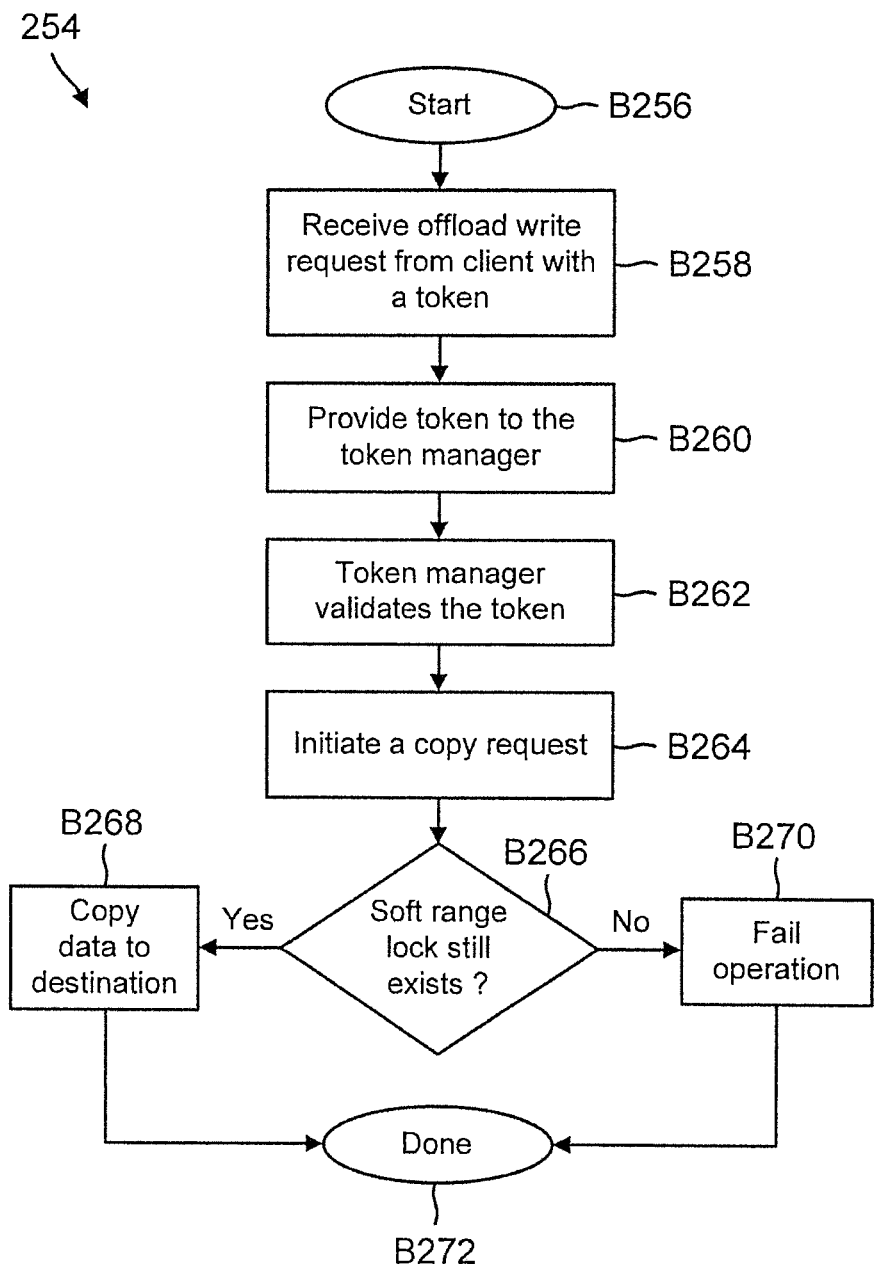

FIG. 2D shows a process 254 for using the token of FIG. 2C to copy the data container from the source location as part of the write offload portion of a copy-offload operation.

The process begins in block B256, after the client receives the token from Network module 214 as a response to the offload read request.

In block B258, an offload write request is received by the Network module Network module 214 with the token from block B250 (FIG. 2C). The request is provided to the token manager 230 in block B260.

In block B262, the token manager 230 first validates the token. The token manager 230 extracts the token identifier and lock owner information from the token. The token manager 230 then uses data structure 231 to determine if the token still exists i.e. it is still valid. If the token is invalid, the operation fails. If the token is validated, then in block B264, the token manager 230 initiates a copy request for copy manager 232. The copy manager 232 selects a copy engine to copy the information and notifies the storage system 109 to start the copy operation.

In block B266, before copying the data container, the file system 236 checks with the lock manager 237 to determine if the soft range lock is still valid i.e. it still exists. This is determined as part of a read operation, when the file system 236 reads the data container. If the lock still exists, then the data container is written to its destination in block B268. In one aspect, a single instance storage (SIS) clone of the data container is read and then written to the destination location.

If the lock is no longer valid, then the operation fails and an error is generated indicating that the token is "invalid." The process then ends in block B272.

Figure 2E:
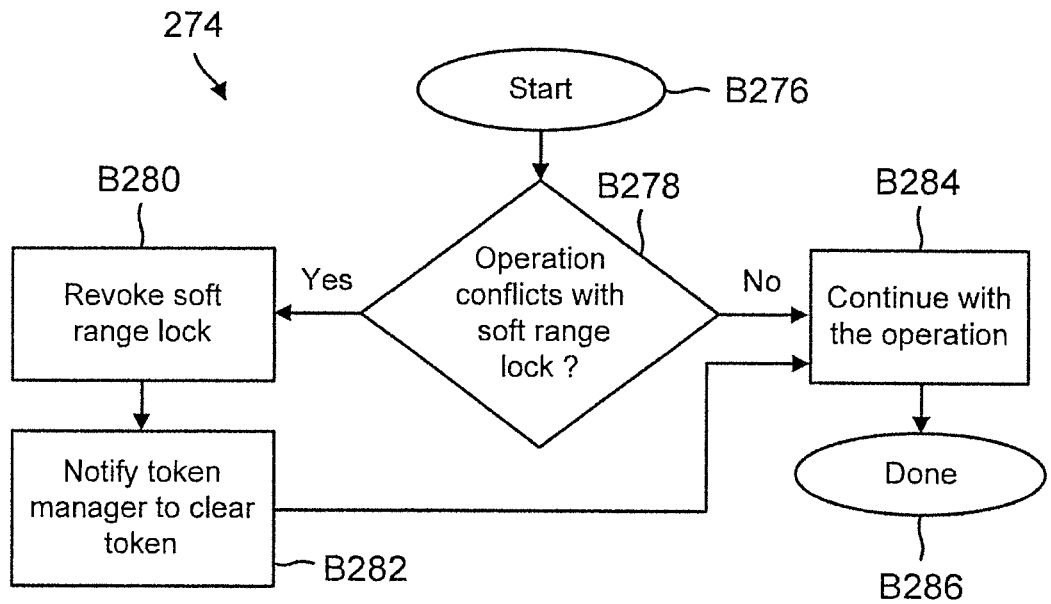

FIG. 2E shows a process 274 for tracking changes to the source data container, according to one aspect. The process begins in block B276. In block B278, the file system 236 determines if there is any file operation that conflicts with the soft range lock protecting the source data container. As an example, a write or delete operation will conflict with the soft range lock.

If yes, then in block B280, the soft range lock is revoked by the lock manager 237. Data structure 237A is updated and in block B282, the token manager 230 is notified to clear the lock from token data structure 231. If there is no conflict with the lock, the file operation continues in block B284. Thereafter, the process ends in block B286.

Figure 2F:
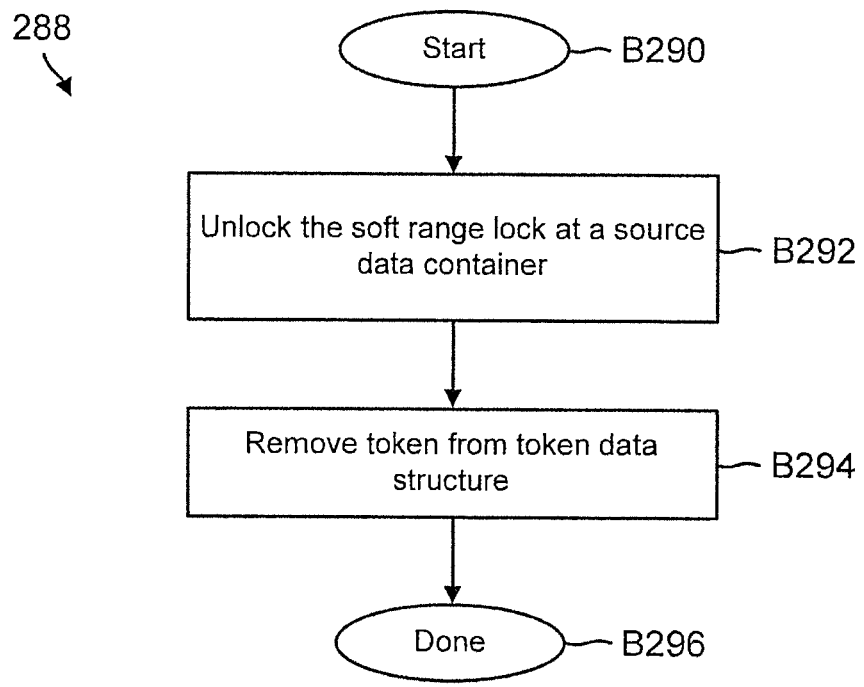

FIG. 2F shows a process 288 for deleting a lock entry by the token manager 230, according to one aspect. The process begins in block B290. In block B292, the lock manager 237 is requested by the token manager 230 to unlock the byte range of the source data container. In block B294, the token manager 230 removes the lock and token entry from data structure 231. Thereafter, the process ends in block B296.

In one aspect, the processes and systems described above have various advantages. For example, a point in time image of the source data container is not used to generate a token. Instead a soft range lock is used to protect the data container content.

Figure 3:
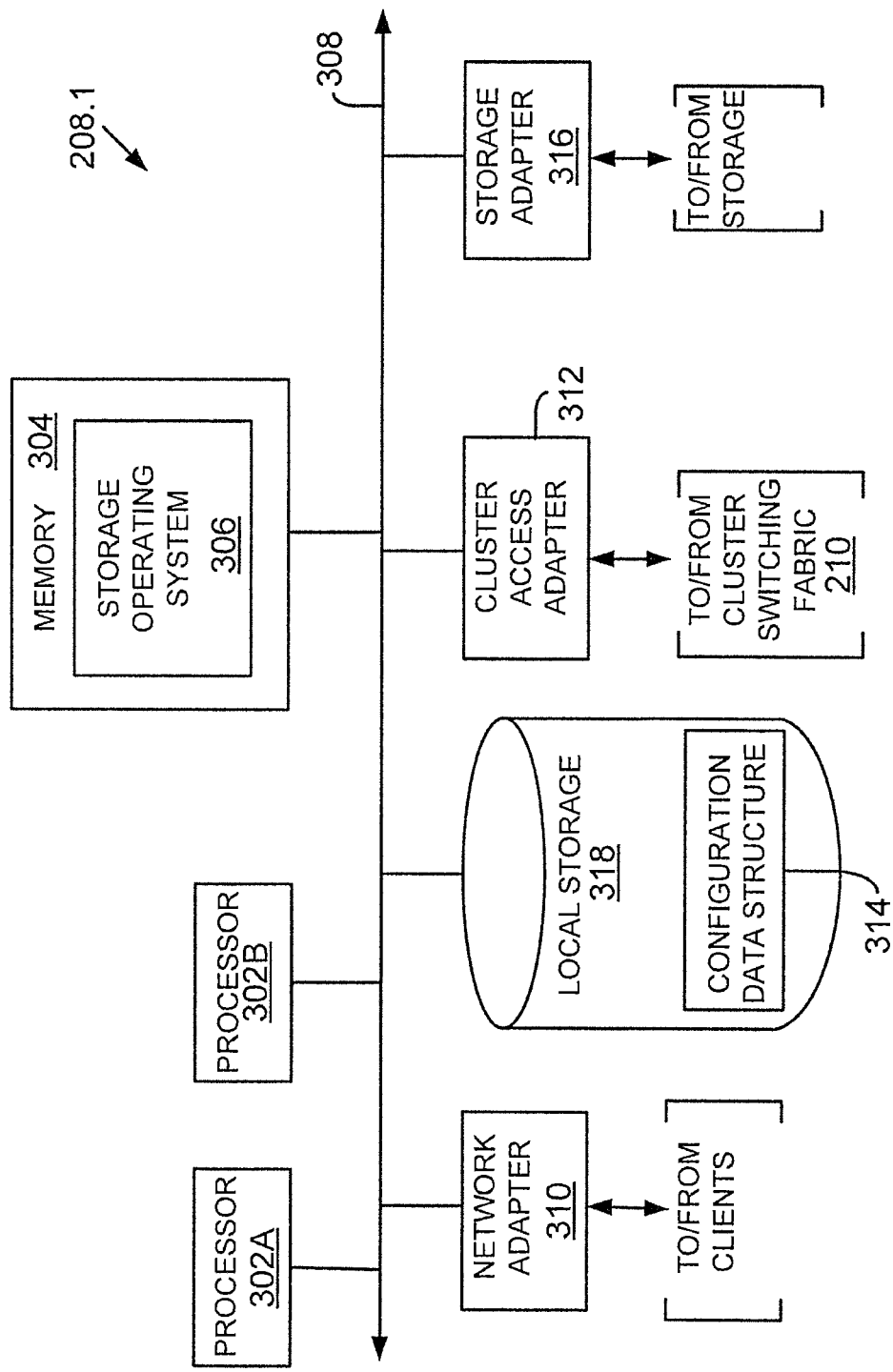
FIG. 3 shows an example of a node used in a cluster based storage system, according to one aspect of the present disclosure of the present disclosure.

Storage System Node 208.1: FIG. 3 is a block diagram of a node 208.1 that is illustratively embodied as a storage system comprising of a plurality of processors 302A and 302B, a memory 304, a network adapter 310, a cluster access adapter 312, a storage adapter 316 and local storage 313 interconnected by a system bus 308. The local storage 313 comprises one or more storage devices utilized by the node to locally store configuration information (e.g., in a configuration data structure 314) for enabling the use of soft range locks for a copy-offload operation.

The cluster access adapter 312 comprises a plurality of ports adapted to couple node 208.1 to other nodes of cluster 200. In the illustrative aspect, Ethernet (or any other protocol) may be used as the clustering protocol and interconnect media, although it will be apparent to those skilled in the art that other types of protocols and interconnects may be utilized within the cluster architecture described herein. In alternate aspects where the Network modules and Disk modules are implemented on separate storage systems or computers, the cluster access adapter 312 is utilized by the Network/Disk module for communicating with other Network/Disk modules in the cluster 200.

Each node 208.1 is illustratively embodied as a dual processor storage system executing a storage operating system 306 (similar to 109, FIG. 1) that preferably implements a high-level module, such as a file system (236, FIG. 2B), to logically organize the information as a hierarchical structure of named directories and files on storage 212.1. However, it will be apparent to those of ordinary skill in the art that the node 208.1 may alternatively comprise a single or more than two processor systems. Illustratively, one processor 302A executes the functions of the Network module 104 on the node, while the other processor 302B executes the functions of the Disk module 106.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the present disclosure.

The storage operating system 306, portions of which is typically resident in memory and executed by the processing elements, functionally organizes the node 208.1 by, inter alia, invoking storage operations in support of the storage service implemented by the node.

The network adapter 310 comprises a plurality of ports adapted to couple the node 208.1 to one or more clients 204.1/204.2 over point-to-point links, wide area networks, virtual private networks implemented over a public network (Internet) or a shared local area network. The network adapter 310 thus may comprise the mechanical, electrical and signaling circuitry needed to connect the node to the network 206 (FIG. 2A).

The storage adapter 316 cooperates with the storage operating system 306 executing at node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 316 comprises a plurality of ports having input/output (I/O) interface circuitry that couples to the storage devices over an I/O interconnect arrangement, such as a conventional high-performance, FC link topology.

Figure 4:
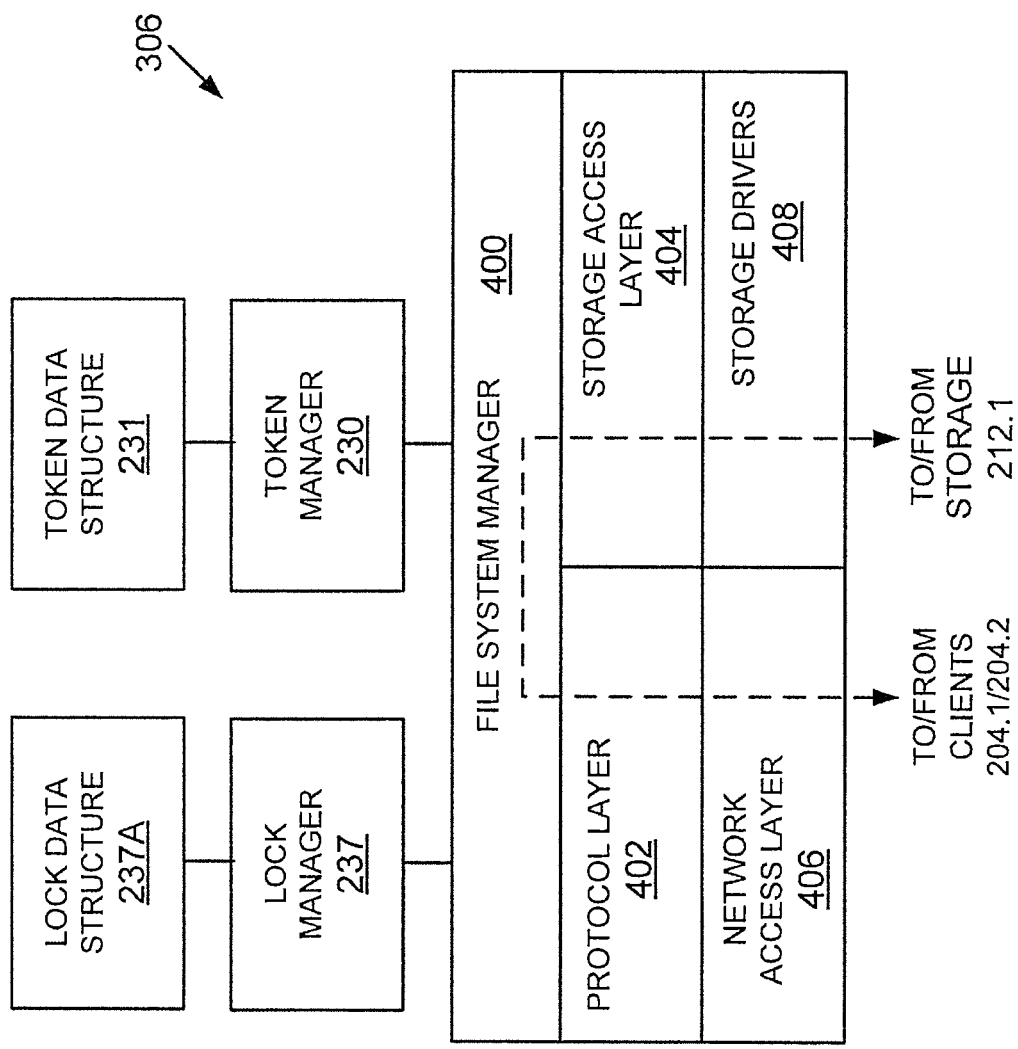
FIG. 4 shows a block diagram of an operating system, used according to one aspect of the present disclosure.

Operating System: FIG. 4 illustrates a generic example of storage operating system 306 executed by node 208.1, according to one aspect of the present disclosure. The storage operating system 306 manages all the storage volumes and conducts read and write operations. The storage operating system 306 interfaces with or includes the lock manager 237 and the token manager 230 for executing a copy-offload operation, as described above in detail.

In one example, storage operating system 306 may include several modules, or "layers" executed by one or both of Network module 214 and Disk module 216. These layers include a file system manager 400 (similar to 236, FIG. 2B) that keeps track of a directory structure (hierarchy) of the data stored in storage devices and manages read/write operations, i.e. executes read/write operations on storage in response to client 204.1/204.2 requests.

Operating system 306 may also include a protocol layer 402 and an associated network access layer 406, to allow node 208.1 to communicate over a network with other systems, such as clients 204.1/204.2. Protocol layer 402 may implement one or more of various higher-level network protocols, such as NFS, CIFS, Hypertext Transfer Protocol (HTTP), TCP/IP and others.

Network access layer 406 may include one or more drivers, which implement one or more lower-level protocols to communicate over the network, such as Ethernet. Interactions between clients' 204.1/204.2 and mass storage devices 212.1 are illustrated schematically as a path, which illustrates the flow of data through operating system 306.

The operating system 306 may also include a storage access layer 404 and an associated storage driver layer 408 to allow Disk module 216 to communicate with a storage device. The storage access layer 404 may implement a higher-level storage protocol, such as RAID, while the storage driver layer 408 may implement a lower-level storage device access protocol, such as FC or SCSI.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the various inventive aspects described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 5:
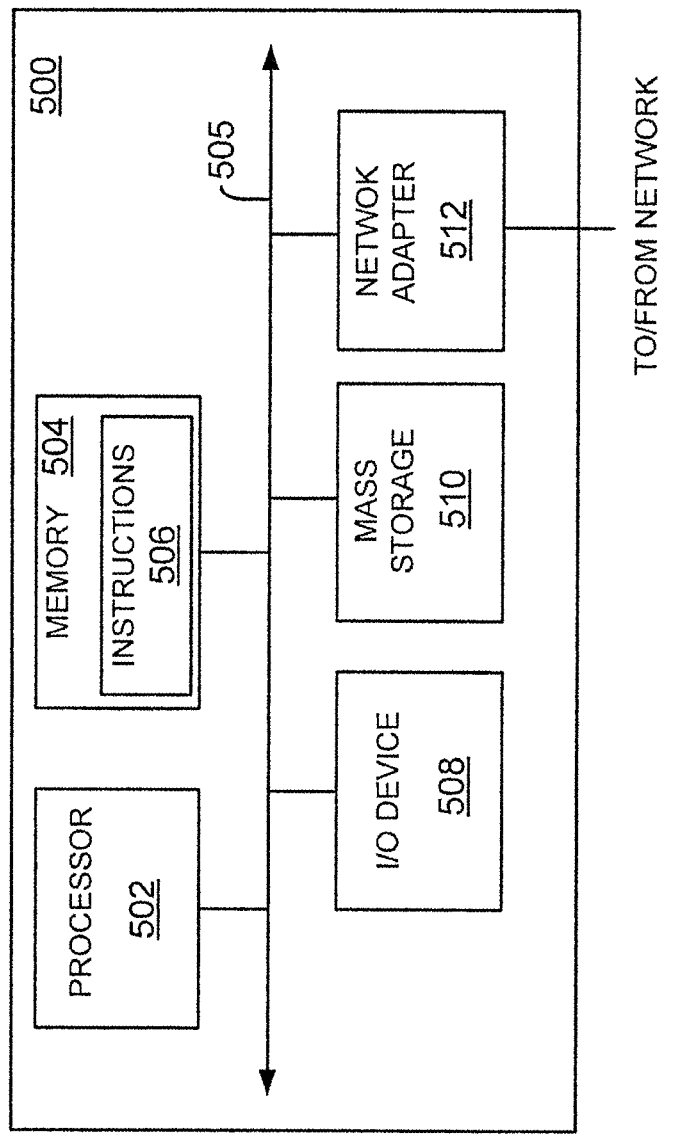
FIG. 5 shows an example of a processing system used according to one aspect of the present disclosure.

Processing System: FIG. 5 is a high-level block diagram showing an example of the architecture of a processing system that may be used according to one aspect. The processing system 500 can represent management console 120, client 104/204, or storage system 108, for example. Note that certain standard and well-known components which are not germane to the present disclosure are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 which implement the process steps described above may reside in and execute (by processors 502) from memory 504.

Also connected to the processors 502 through the bus system 505 are one or more internal mass storage devices 510, and a network adapter 512. Internal mass storage devices 510 may be or include any conventional medium for storing large volumes of data in a non-volatile manner, such as one or more magnetic or optical based disks. The network adapter 512 provides the processing system 500 with the ability to communicate with remote devices (e.g., storage servers 20) over a network and may be, for example, an Ethernet adapter, a Fibre Channel adapter, or the like.

The processing system 500 also includes one or more input/output (I/O) devices 508 coupled to the bus system 63. The I/O devices 508 may include, for example, a display device, a keyboard, a mouse, etc.

Cloud Computing: The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. After the application layer, is a cloud platform and cloud infrastructure, followed by a "server" layer that includes hardware and computer software designed for cloud specific services. In this example, a source storage system and a destination storage system may be presented in a cloud for storing information.

Thus, a method and apparatus for copying a data container from a source location to a destination location have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
   placing a shared lock for a data container for generating a token for a copy-offload operation for copying the data container from a source location to a destination location, where presence of the shared lock indicates that content of the data container has not changed during the copy-offload operation; wherein a token for the copy-offload operation represents the content of data container and includes information regarding the shared lock;
   providing the token with the shared lock information to the client that requests the copy-offload operation;
   determining if the shared lock exists before copying the data container to the destination location indicating that the data container content has not changed; and
   copying the data container to the destination location without using a point in time copy of the data container.

2. The method of claim 1, wherein a token manager generates the token and embeds a lock identifier and an identifier for identifying an owner of the shared lock.

3. The method of claim 1, wherein a storage operating system reads the data container to determine if the shared lock exists, before copying the data container from the source location to the destination location.

4. The method of claim 1, wherein a storage operating system uses a single instance clone of the data container for copying the data container at the destination location.

5. The method of claim 1, wherein the client first sends an offload read request for the copy-offload operation and receives the token in response to the offload read request and then the client sends an offload write request with the token for copying the data container.

6. The method of claim 1, wherein the shared lock is revoked when there is a write operation for the data container after the shared lock is placed.

7. The method of claim 1, wherein the shared lock is revoked when there is a delete operation for the data container after the shared lock is placed.

8. A non-transitory, machine readable storage medium having stored thereon instructions for performing a method, comprising machine executable code which when executed by at least one machine, causes the machine to:
   place a shared lock for a data container for generating a token for a copy-offload operation for copying the data container from a source location to a destination location, where presence of the shared lock indicates that content of the data container has not changed during the copy-offload operation; wherein a token for the copy-offload operation represents the content of data container and includes information regarding the shared lock;
   provide the token with the shared lock information to the client that requests the copy-offload operation;
   determine if the shared lock exists before copying the data container to the destination location indicating that the data container content has not changed; and
   copy the data container to the destination location without using a point in time copy of the data container.

9. The storage medium of claim 8, wherein a token manager generates the token and embeds a lock identifier and an identifier for identifying an owner of the shared lock.

10. The storage medium of claim 8, wherein a storage operating system reads the data container to determine if the shared lock exists, before copying the data container from the source location to the destination location.

11. The storage medium of claim 8, wherein a storage operating system uses a single instance clone of the data container for copying the data container at the destination location.

12. The storage medium of claim 8, wherein the client first sends an offload read request for the copy-offload operation and receives the token in response to the offload read request and then the client sends an offload write request with the token for copying the data container.

13. The storage medium of claim 8, wherein the shared lock is revoked when there is a write operation for the data container after the shared lock is placed.

14. The storage medium of claim 8, wherein the shared lock is revoked when there is a delete operation for the data container after the shared lock is placed.

15. A system, comprising:
   a memory having machine readable medium comprising machine executable code having stored thereon instructions; and
   a processor module coupled to the memory, the processor module configured to execute the machine executable code to:
   place a shared lock for a data container for generating a token for a copy-offload operation for copying the data container from a source location to a destination location, where presence of the shared lock indicates that content of the data container has not changed during the copy-offload operation; wherein a token for the copy-offload operation represents the content of data container and includes information regarding the shared lock;
   provide the token with the shared lock information to the client that requests the copy-offload operation;
   determine if the shared lock exists before copying the data container to the destination location indicating that the data container content has not changed; and
   copy the data container to the destination location without using a point in time copy of the data container.

16. The system of claim 14, wherein a token manager generates the token and embeds a lock identifier and an identifier for identifying an owner of the shared lock.

17. The system of claim 14, wherein a storage operating system reads the data container to determine if the shared lock exists, before copying the data container from the source location to the destination location.

18. The system of claim 14, wherein a storage operating system uses a single instance clone of the data container for copying the data container at the destination location.

19. The system of claim 14, wherein the client first sends an offload read request for the copy-offload operation and receives the token in response to the offload read request and then the client sends an offload write request with the token for copying the data container.

20. The system of claim 14, wherein the shared lock is revoked when there is a write operation for the data container subsequent to when the shared lock is placed.

21. The system of claim 14, wherein the shared lock is revoked when there is a delete operation for the data container after the shared lock is placed.

22. A machine implemented method, comprising:
- placing a byte range lock for a data container for generating a token for a copy-offload operation for copying the data container from a source location to a destination location, where presence of the byte range lock indicates that content of the data container has not changed during the copy-offload operation; wherein a token for the copy-offload operation represents the content of data container and includes information regarding the byte range lock;
- providing the token with the byte range lock information to the client that requests the copy-offload operation;
- determining if the byte range lock exists before copying the data container to the destination location indicating that the data container content has not changed; and
- copying the data container to the destination location without using a point in time copy of the data container.

* * * * *